(12) United States Patent
Tsai et al.

(10) Patent No.: US 7,027,386 B2
(45) Date of Patent: Apr. 11, 2006

(54) READ-ONLY OPTICAL RECORDING MEDIUM WITH ZNO NEAR-FIELD OPTICAL INTERACTION LAYER

(75) Inventors: Din-Ping Tsai, Taipei (TW); Yu-Hsuan Lin, Taipei (TW); Hsun-Hao Chang, Taipei (TW)

(73) Assignee: National Taiwan University, Taipei (TW)

( * ) Notice: Subject to any disclaimer, the term of this patent is extended or adjusted under 35 U.S.C. 154(b) by 395 days.

(21) Appl. No.: 10/330,151

(22) Filed: Dec. 30, 2002

(65) Prior Publication Data

US 2004/0032822 A1 Feb. 19, 2004

(30) Foreign Application Priority Data

Jun. 3, 2002 (TW) .............................. 91208108 U

(51) Int. Cl.
*G11B 7/24* (2006.01)

(52) U.S. Cl. ...................... 369/288; 369/283; 369/284; 428/64.4; 428/64.1; 428/432; 430/270.12; 430/270.13

(58) Field of Classification Search ................ 369/288, 369/283, 13.35, 13.38, 275.2, 275.5, 284; 428/64.6, 64.1, 64.2, 900, 64.4, 432, 635, 428/699; 430/270.13, 945, 270.12; 65/421

See application file for complete search history.

(56) References Cited

U.S. PATENT DOCUMENTS

| | | | | |
|---|---|---|---|---|
| 4,184,860 A | * | 1/1980 | Schneider et al. | ............. 65/421 |
| 5,082,749 A | * | 1/1992 | Carcia | ......................... 428/699 |
| 5,125,750 A | | 6/1992 | Corle et al. | |
| 5,407,755 A | * | 4/1995 | Brucker et al. | .............. 428/635 |
| 5,470,628 A | * | 11/1995 | Tominaga et al. | .......... 428/64.4 |
| 5,718,961 A | * | 2/1998 | Hong | .......................... 428/64.1 |
| 6,226,258 B1 | | 5/2001 | Tominaga et al. | |
| 6,242,157 B1 | | 6/2001 | Tominaga et al. | |
| 6,319,582 B1 | | 11/2001 | Tominaga et al. | |
| 6,329,036 B1 | * | 12/2001 | Kikukawa et al. | .......... 428/64.1 |
| 6,340,813 B1 | | 1/2002 | Tominaga et al. | |
| 6,552,968 B1 | * | 4/2003 | Kishima et al. | .......... 369/13.38 |
| 6,632,583 B1 | * | 10/2003 | Kunitomo et al. | ...... 430/270.13 |

* cited by examiner

*Primary Examiner*—William Korzuch
*Assistant Examiner*—Kim-Kwok Chu
(74) *Attorney, Agent, or Firm*—Troxell Law Office, PLLC

(57) ABSTRACT

This invention relates to a read-only near-field optical disk using a zinc-oxide (ZnO) nano-structured thin film as the localized near-field optical interaction layer. This read-only near-field optical disk is a multi-layered body at least comprising; (a) a transparent substrate with pre-recorded pits or marks; (b) a reflection thin film; (c) a zinc-oxide (ZnO) nano-structured thin film which is capable of causing localized near-field optical interactions; (d) a first and a second protective and spacer layers formed above or below the localized near-field optical interaction layer, which are also made of transparent dielectric material. Ultrahigh density near-field optical readout can be achieved by localized near-field optical interaction between the zinc-oxide (ZnO) nano-structured thin film and the reflection layer on pre-recorded structure.

14 Claims, 4 Drawing Sheets

READ-ONLY OPTICAL RECORDING MEDIUM WITH ZNO NEAR-FIELD OPTICAL INTERACTION LAYER

FIELD OF THE INVENTION

This invention is a read-only near-field optical disk using a zinc-oxide (ZnO) nano-structured thin film as the localized near-field optical interaction layer. Ultrahigh density near-field recording can be achieved by this read-only optical disk.

BACKGROUND OF THE INVENTION

The conventional optical disks are practical and popular in optical recording media with fine storage quality and high stability, which have been widely utilized for data storage and multimedia entertainment. Accompanying with the advanced technological development, a mass amount of disks are produced into lots of categories and features, mainly divided into three types, read-only, write-once, and rewritable. The read-only type disks are CD-DA, CD-ROM, CD-I, VCD, DVD-ROM, DVD-Video etc. The write-once type disks are CD-R, DVD-R and so on. The rewritable disks are MD, MO, PD, CD-RW, DVD-RW, CD-RAM etc.

A pre-recorded disk is also called a read-only disk. The fabrication of read-only disk is to lithograph pre-recorded recording-pits as the recorded marks on a transparent substrate and then subsequently coated the reflection layer and protection layer by sputtering or spin-coating. The recorded marks can be read and retrieved by the reflected optical signals of the focused laser light delivered and collected by the pick-up head lens of the optical disk drive. Currently, the distance between the optical disk and the pick-up head lens is much larger than the wavelength used by the optical disks and disk drives commercially available. That means the optical recording technology is using far-field optics alone, it is unavoidable that an optical interference or diffraction phenomena will occur due to the wave characteristics of optics, and the spatial resolution of recording and reading is limited by the optical diffraction limit (i.e. $1.22\lambda/2n \sin\theta$, where $\lambda$ is the wavelength of the light used, n is the refractive index of the medium, and $\theta$ is the half angle of the aperture). In the past, the following methods were used to increase the recording capacity of the conventional optical disks;

(1) A more efficient coding and decoding technique.
(2) A smaller size of all the pits and their pitches of the tracks on optical disks.
(3) Use of the shorter wavelength of light source.
(4) Increase of the numerical aperture value of the objective lens.
(5) Use of the volumetric technology such as multi-layer recording, holography, etc.

Aforementioned methods are only the optimizations under the diffraction limit of far-field optics. A most basic way to improve the recording density and break through the diffraction limit is the use of the near-field optical technology. Eric Betzig of the Bell Laboratory, USA, first demonstrated the near-field optical recording using an optical fiber probe in 1992. His results overcome the optical diffraction limit. The recorded density was effectively improved. An optical fiber probe with an aperture of several tens of nanometer at the fiber end is used for the near-field optical recording and readout on a multi-layered platinum (Pt) and cobalt (Co) magneto-optical medium layer in his work. By controlling the fiber probe in a very close distance which is much smaller than the wavelength used for the experiments, an ultrahigh density recording of 45 Giga-bits per square inch was achieved. However, there are several difficulties and disadvantages of using the near-field fiber probe such as the precise control of the distance between the fiber probe and surface of the recording medium (about a few nanometers), the fragility of the fiber probe, low scanning speed, low optical throughput and high optical attenuation (around $10^{-6}$ to $10^{-3}$), and complexity of the fabrication of the nanometer-scale aperture at the end of the fiber probe.

On the other hand, an issued U.S. Pat. No. 5,125,750, disclosed a solid immersion lens (SIL) prototype that was possible and practical to implement the near-field disk drivers by G. S. Kino and his research team on the Stanford University, USA. The method of said patent has a reading/writing head which made of the semi-spherical and the super semi-spherical transparent solids—which have a high refection index, n,—for effective shrinking the reading/writing marks. Thus, said method of optical head could be speeding a reading/writing rate, then by adopting the present disk technology to directly develop into the high density optical recording of near-field disk drivers. In 1995, a company named TeraStor in San Jose, Calif., USA adopted this patented technological SIL as a "flying" reading/writing pick-up head to the near-field optical recording disk drivers, and tried to produce a first optical disk drive in high density optical recording. This high-speed "flying" reading/writing pick-up head had to be effectively controlled under a near-field range. The technical problems of the reliability of the flying pick-up head in the optical near field finally hindered the further developments of the high density near-field optical disk driver.

The issued patents of U.S. Pat. Nos. 6,226,258; 6,242,157; 6,319,582 and 6,340,813, in which Dr. Junji Tominaga disclosed a design, by adding two nano-film layers (SiN in 20 nm and Sb in 15 nm) onto the normally used phase-change optical disk to replace the near-field effect of an optical fiber probe of the near-field scanning microscope, and to carry out the read/write actions beyond the optical diffraction limit.

Aforesaid design show a usage of alternating of thin-film structure on the disks to reach a near-field ultra high density of optical recording. Then accompanying with an improved structure of the film layer of said disks, said structure improved the two main structures of said film layer from a first category (Sb and $SiNx_1$) to a second category (AgOx and ZnS—$SiO_2$). However, said film layer of said two categories, which generated a localized near-field optical effect of Sb and AgOx nano-film layer, of their substances/materials are unstable, and can easily lose the properties of localization due to high temperature and the absorption of water vapor.

The present invention is a read-only near-field optical disk with a zinc-oxide (ZnO) nano-structured thin film and a spacer layer such as ZnS—$SiO_2$ on the pre-recorded substrate. The ultrahigh density read-only near-field recording disk can be effectively achieved by this invention.

In summary, aforementioned conventional far-field optical method appears that the short-wavelength of light-source is costly, and the reading/writing spots of a conventional disk driver have an optical diffraction limit, so only the near-field optics with no diffraction limits can effectively improve the recording spot size below the diffraction limits. Additionally, the near-field optical technique of aforesaid near-field scanning probe and SIL near-field optical disk drive have lots of difficulties, which makes said near-field optical disk become an appropriate choice for near-field optical recording. It is known that Sb and AgOx are unstable substances/materials for manufacturing disks, so this invention uses more stable and better localized near-field optical effect of zinc-oxide (ZnO) nano-structured thin film(s) to produce the read-only zinc-oxide (ZnO) near-field optical disks. This invention is to use the stability and the localization effect of the zinc-oxide (ZnO) nano-structured thin film along with a near-field spacer layer of ZnS—SiO$_2$ to achieve an ultrahigh density near-field optical disk. The localized near-field optical effects can be happened between the zinc-oxide (ZnO) nano-structured thin film and pre-recorded pits or marks on a transparent substrate in near-field range, There is no diffraction limit for the read-only optical storage using this method.

SUMMARY OF THE INVENTION

This invention is related to a zinc-oxide (ZnO) nano-structured thin film used in read-only near-field optical disks. Because the near-field optical interactions have no diffraction limits, this read-only near-field optical disk is capable of obtaining ultrahigh recording density and capacity.

The zinc-oxide (ZnO) nano-structured thin film is fabricated along with a near-field spacer layer of ZnS—SiO$_2$ on a transparent substrate with pre-recorded recording pits. The localized near-field optical interactions between zinc-oxide (ZnO) nano-structured thin film and the pre-recorded pits on the substrate enable the ultrahigh spatial resolution readout of the pre-recorded pits smaller than the optical diffraction limit.

Another object of this invention is to provide various rang of optimal thickness for said nano-structured thin film layers for a better localized optical effect or interaction under a stable operating circumstance.

Another object of this invention is to provide a structure of multilayered thin film with metallic or glass, or the materials for supporting a process of localized near-field optical effect in readout of the pre-recorded pits or marks.

BRIEF DESCRIPTION OF THE DRAWINGS

For a better understanding of the present invention as well as other objects and features, reference is made to disclose this invention taken in conjunction with drawings as follows.

DESCRIPTION OF THE PREFERRED EMBODIMENTS

The following descriptions of the preferred embodiments are provided to understand the features and the structures of the present invention.

Figure 1:
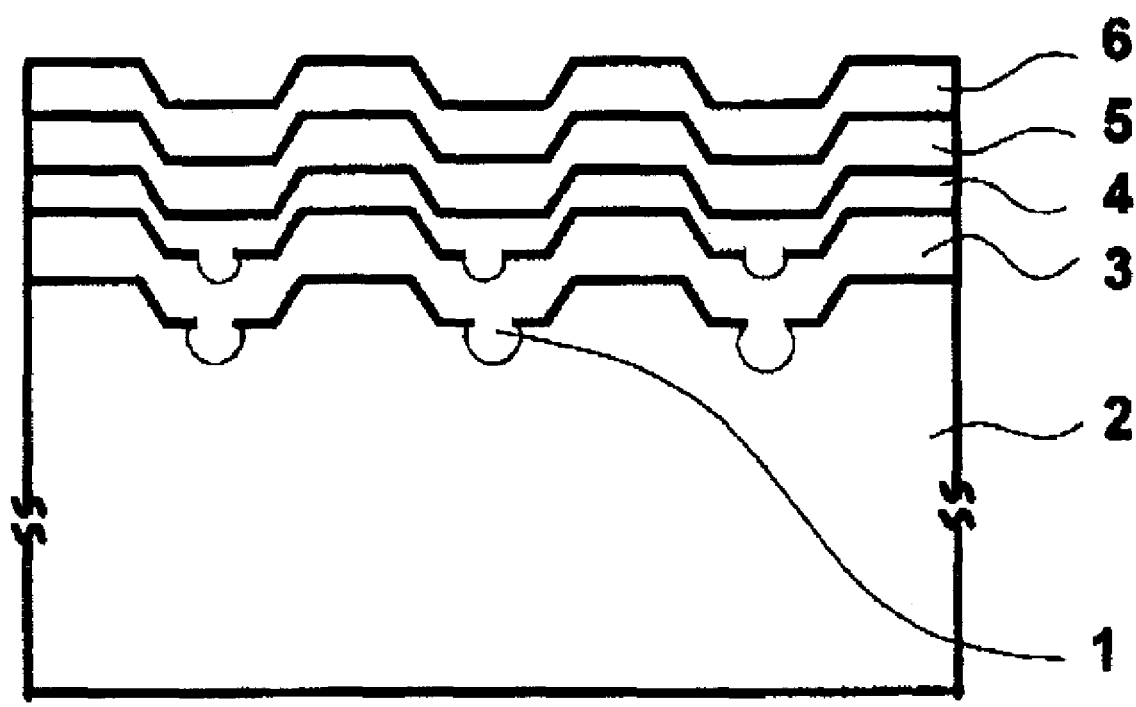
FIG. 1 is a structural diagram showing the read-only optical recording medium with zinc-oxide (ZnO) near-field optical interaction layer for disks in this invention.

FIG. 1 is a structural diagram of the read-only optical recording medium with zinc-oxide (ZnO) near-field optical interaction layer for disks according to present invention. The structure of the read-only optical recording medium comprises a transparent substrate 2 with pre-recorded pits or marks 1 and a plurality of thin film layers formed on said a transparent substrate 2 with pre-recorded pits or marks 1. The plurality of thin films consist of a refection thin film layer 3, a first transparent dielectric thin film layer 4, a zinc-oxide (ZnO) nano-structured thin film layer 5 which is capable of causing localized near-field optical interactions, and a second transparent dielectric thin film layer 6. The transparent substrate with the pre-recorded pits or marks is made of SiO$_2$ glass material or doped SiO$_2$ glass material with Sodium (Na), Lithium (Li), Calcium (Ca), Potassium (K), Aluminum (Al), Germanium (Ge), and Boron (B), etc. in various ratio, or transparent polymerized materials which comprise polycarbonate, or epoxy resin, etc, The pre-recorded pits or marks 1 are lithographed for prerecording, and the dimension of said pre-recorded pits or marks 1 can be smaller than the optical diffraction limit. The material of said refection thin film layer 3 is selected from each or alloy group of the material such as Gold (Au), Sliver (Ag), Aluminum (Al), and Copper (Cu), etc. The first transparent dielectric thin film layer 4 and the second transparent dielectric thin film layer 6 can be a multiple layered structure selected from the group of the transparent dielectric materials consisting of ZnS—SiO$_2$, ZnS—SiOx, SiO$_2$, SiOx$_1$ or SiNx. The optimal thickness of the first transparent dielectric thin film layer 4 and the second transparent dielectric thin film layer 6 is in a range of about 5 nm to 200 nm. The zinc-oxide (ZnO) nano-structured thin film layer 5 that is capable of causing localized near-field optical effect is made of the compound of zinc-oxide (ZnO), or the compositions of zinc-oxide (ZnO) and zinc. The optimal thickness of the zinc-oxide (ZnO) nano-structured thin film layer 5 is in the range of 5 nm to 100 nm.

Figure 2:
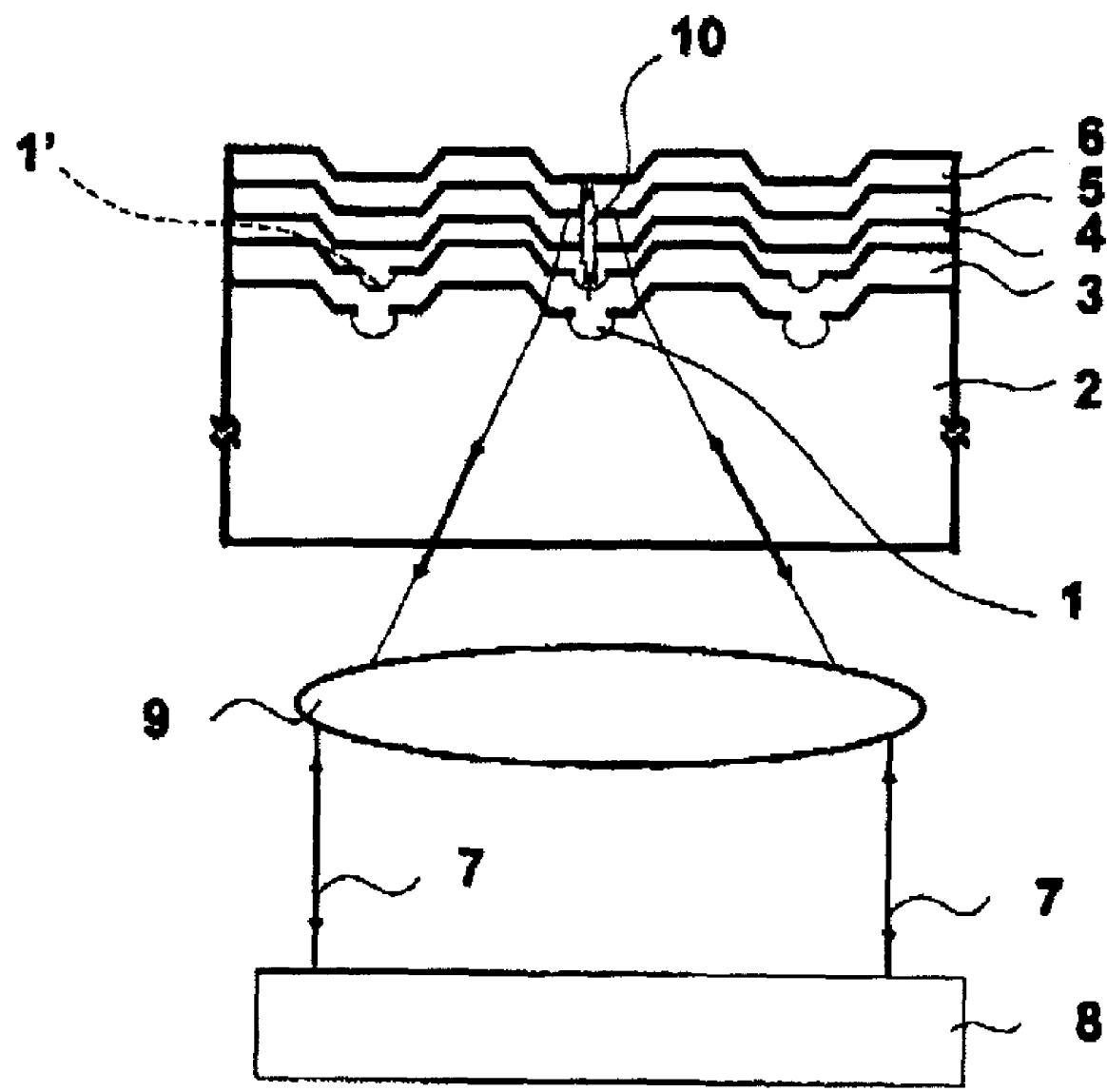
FIG. 2 is a schematic illustration showing the working principle of the read-only optical recording medium with zinc-oxide (ZnO) near-field optical interaction layer for disks in this invention.

FIG. 2 shows the working principle of the read-only optical recording medium with zinc-oxide (ZnO) near-field optical interaction layer for disks according to the present invention. The light beams (in/out) 7 of light source via the optical lens 9 of a pick-up head of disk driver 8 penetrate pre-recorded pits or marks 1 of transparent substrate 2, reflection thin film layer 3 and the first transparent dielectric thin film layer 4 thereto focusing on zinc-oxide (ZnO) nano-structured thin film layer 5 which is capable of causing localized near-field optical interactions. The localized near-field optical interaction beyond diffraction limit 10 generated by the interaction of the focused laser and zinc-oxide (ZnO) nano-structured thin film layer 5 can interact with the recorded pits or marks after thin film coating 1' to read the storage data of said recorded pits or marks after thin film coating 1'. For the content of said recorded pits or marks after thin film coating 1' is the same as the content of said pre-recorded pits or marks 1 of said transparent substrate 2. That is to say, the content of said pre-recorded pits or marks 1 can be read out.

Therefore, accompanying with a rotating disk and a high-speed readout scanning optical head of a disk driver, the readout action of ultrahigh density read-only optical recording medium can be carried out. The first transparent dielectric thin film layer 4 and the second transparent dielectric thin-film layer 6 can protect and stabilize the zinc-oxide (ZnO) nano-structured thin film layer that is capable of causing localized near-field optical interactions 5, and maintain a fixed near-field distance between said recorded pits or marks after thin film coating 1' and said a zinc-oxide (ZnO) nano-structured thin film layer that is capable of causing localized near-field optical interactions 5.

Figure 3:
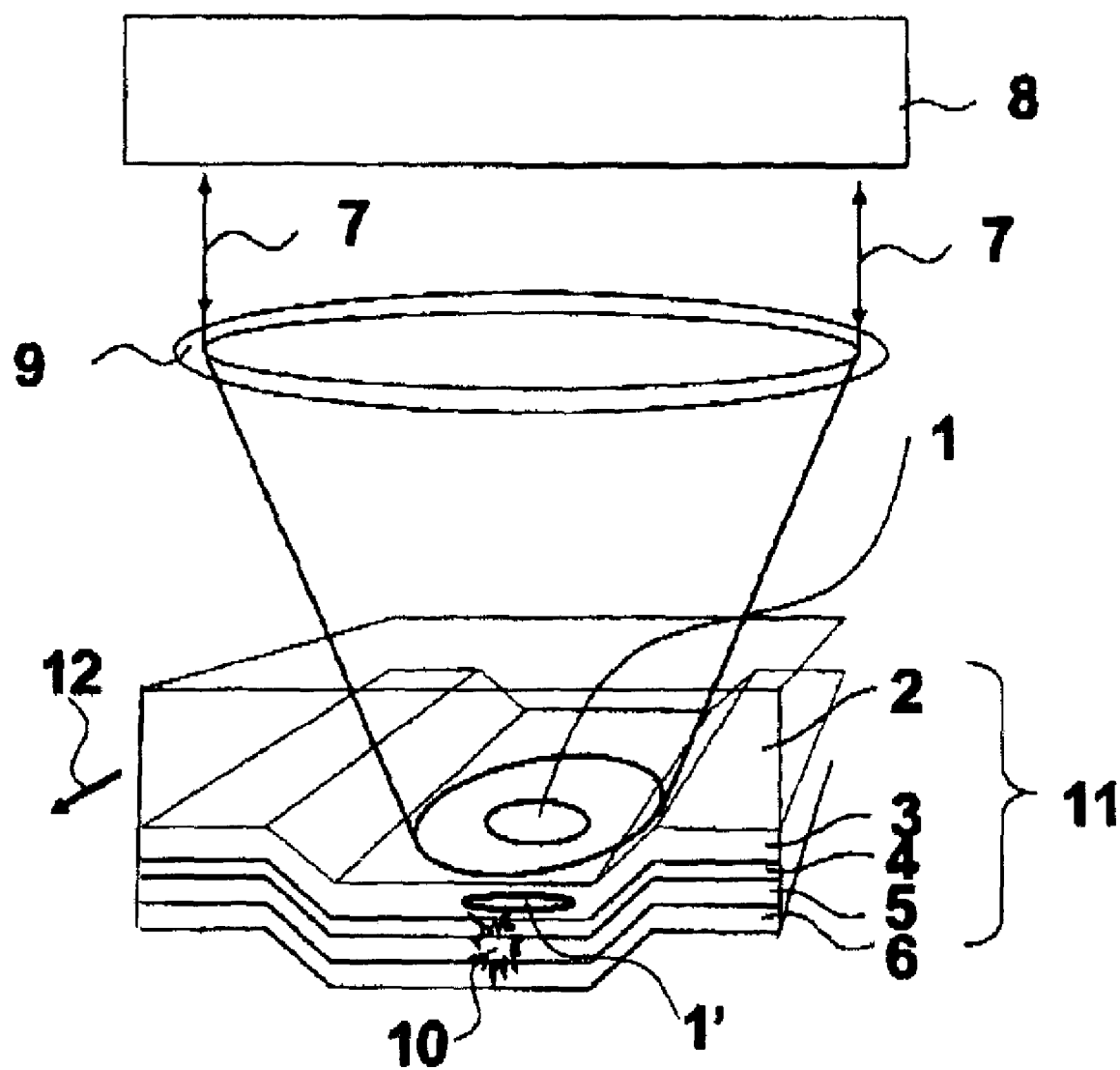
FIG. 3 is a schematic illustration showing one preferred embodiment of the pick-up head and optical lens of a disk driver in coordination with the read-only optical recording medium with zinc-oxide (ZnO) near-field optical interaction layer of optical disk in this invention.

As shown in FIG. 3, it is a preferred embodiment of a read-only zinc-oxide (ZnO) near-field optical disk 11 and pick-up head of disk driver 8. The pick-up head of disk driver 8 maintains the readout focusing at co-planarity and co-track of said read-only zinc-oxide (ZnO) near-field optical disk 11 by current tracking and focusing technology of the disk driver, and the read-only zinc-oxide (ZnO) near-field optical disk 11 rotates in the rotation direction of optical disk 12. The localized near-field optical interaction beyond diffraction limit 10 coupled between zinc-oxide (ZnO) nano-structured thin film layer that is capable of causing localized near-field optical interactions 5 and recorded pits or marks after thin film coating 1' can successfully readout said pre-recorded pits or marks 1 formed on transparent substrate 2 in said read-only zinc-oxide (ZnO) near-field optical disk 11.

Figure 4:
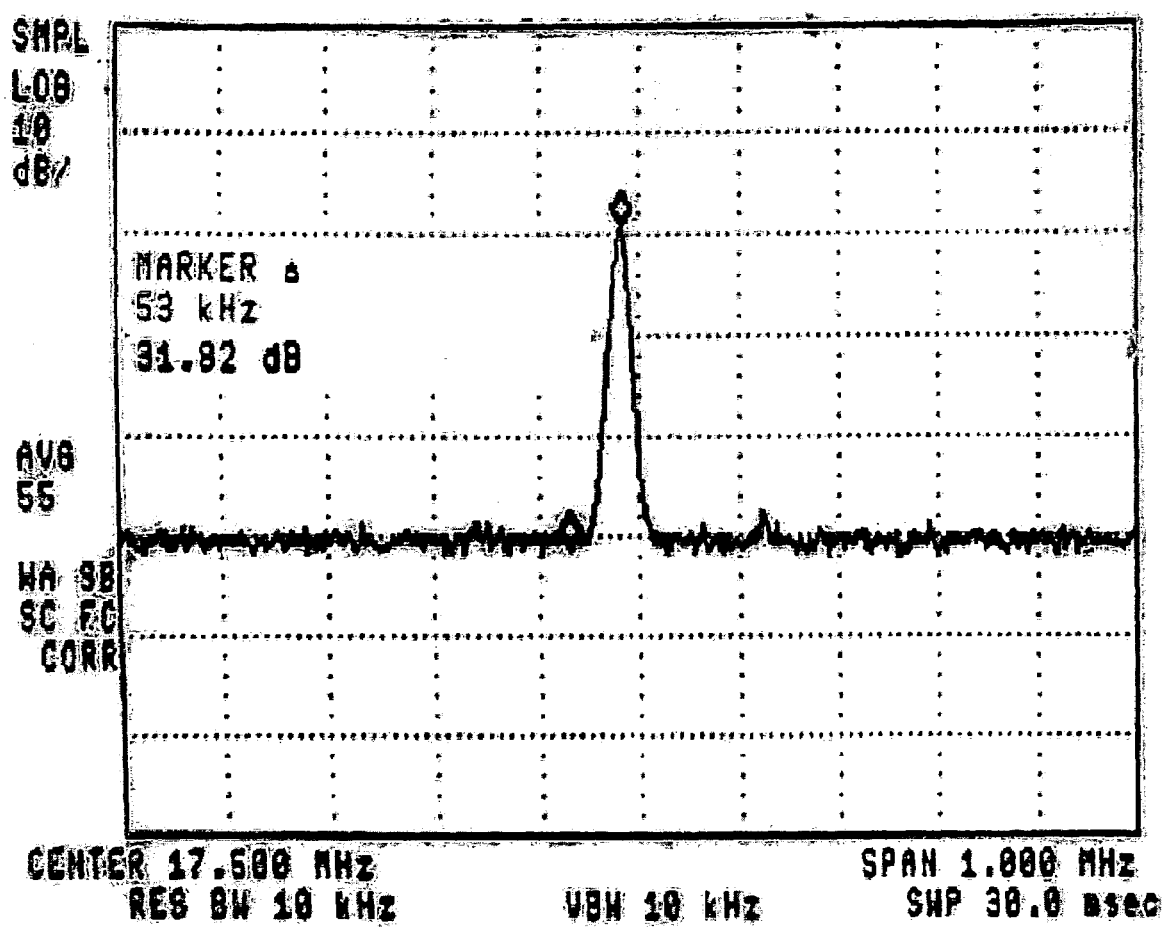
FIG. 4 shows the readout results of the pre-recorded marks of the read-only optical disk with zinc-oxide (ZnO) near-field optical interaction layer by using an optical disk tester.

One of the experimental readout results of the read-only zinc-oxide (ZnO) near-field optical disk 11 is displayed in FIG. 4. A disk tester (manufactured by Pulstec Industrial Co., Ltd., Model DDU-1000) with the wavelength of light source at 673 nm and numerical aperture (NA) of the pick-up head lens at 0.6 is used to readout the pre-recorded 100 nm marks on a read-only zinc-oxide (ZnO) near-field optical disk 11 in this invention. The disk is rotated in a constant liner velocity at 3.5 m/s, and the readout laser power out of the pick-up head is 4 mW. The readout results measured by a spectrum analyzer is shown in FIG. 4. The measured carrier-to-noise (CNR) value of the pre-recorded 100 nm marks is 31.82 dB. It Is clearly evident that read-only zinc-oxide (ZnO) near-field optical disk 11 described in this invention is capable of recording pre-recorded pits or marks below the optical diffraction limit.

While this invention has been described in conjunction with particular embodiments, it is evident that alternatives, modifications and variations will now be apparent to those skilled in the art. Accordingly, the present invention is intended to embrace all such alternatives, modifications and variations and fall within the spirit and scope of the appended claims. Moreover, the description and illustration of the invention is by way of example, and the scope of the invention is not limited to the exact details shown or described as well as the order of structure, the values, angles, directions of focusing beams.

The invention claimed is:

1. A read-only optical recording medium with zinc-oxide near field optical interaction comprising:
   a) a transparent substrate having pre-recorded marks;
   b) a first transparent dielectric thin film layer;
   c) a reflection thin film layer located between the transparent substrate and the first transparent dielectric thin film layer;
   d) a second transparent dielectric thin film layer; and
   e) a zinc-oxide nano structured thin film layer located between the first transparent dielectric thin film layer and the second transparent dielectric thin film layer, the zinc-oxide nano structured thin film layer causing localized near-field optical interactions between the first transparent dielectric thin film layer and the second transparent dielectric thin film layer.

2. The read-only optical recording medium according to claim 1, wherein the transparent substrate is made of an $SiO_2$ glass material including sodium, lithium, calcium, potassium, aluminum, germanium, and boron.

3. The read-only optical recording medium according to claim 1, wherein the transparent substrate is made of transparent polymerized materials including one of a polycarbonate and an epoxy resin.

4. The read-only optical recording medium according to claim 1, wherein the reflection thin film layer is made of a material selected from gold, silver, aluminum, Copper, and an alloy thereof.

5. The read-only optical recording medium according to claim 4, wherein the reflection thin film layer is one of a single and a multiple layer structure.

6. The read-only optical recording medium according to claim 1, wherein the reflection thin film layer is one of a single and a multiple layer structure.

7. The read-only optical recording medium according to claim 1, wherein the first transparent dielectric thin film layer and the second transparent dielectric thin film layer are selected from a group of transparent dielectric materials consisting of ZnS—SiOx, SiOx, and SiNx.

8. The read-only optical recording medium according to claim 7, wherein the first transparent dielectric thin film layer and the second transparent dielectric thin film layer are one of a single and a multiple layer structure.

9. The read-only optical recording medium according to claim 7, wherein the first transparent dielectric thin film layer and the second transparent dielectric thin film layer have a thickness between 5 nm and 200 nm.

10. The read-only optical recording medium according to claim 1, wherein the first transparent dielectric thin film layer and the second transparent dielectric thin film layer are one of a single and a multiple layer structure.

11. The read-only optical recording medium according to claim 1, wherein the first transparent dielectric thin film layer and the second transparent dielectric thin film layer have a thickness between 5 nm and 200 nm.

12. The read-only optical recording medium according to claim 1, wherein the zinc-oxide nano structured thin film layer is made of one of zinc-oxide, and zinc-oxide and zinc.

13. The read-only optical recording medium according to claim 12, wherein the zinc-oxide nano structured thin film layer having a thickness between 5 nm and 100 nm.

14. The read-only optical recording medium according to claim 1, wherein the zinc-oxide nano structured thin film layer having a thickness between 5 nm and 100 nm.

* * * * *